United States Patent [19]

Gordon

[11] Patent Number: 4,673,270

[45] Date of Patent: Jun. 16, 1987

[54] CHANNEL ADD/DROP FILTER-COUPLER

[75] Inventor: Eugene I. Gordon, Convent Station, N.J.

[73] Assignee: AMP Incorporated, Harrisburg, Pa.

[21] Appl. No.: 750,808

[22] Filed: Jun. 28, 1985

[51] Int. Cl.⁴ .............................................. G02B 6/26
[52] U.S. Cl. .............................. 350/96.15; 350/96.29; 370/3
[58] Field of Search ............... 350/96.15, 96.16, 96.29, 350/96.30; 370/1, 3

[56] References Cited

U.S. PATENT DOCUMENTS

| 4,315,666 | 2/1982 | Hicks, Jr. | 350/96.15 |
| 4,342,499 | 8/1982 | Hicks, Jr. | 350/96.15 |
| 4,493,528 | 1/1985 | Shaw et al. | 350/96.15 |
| 4,556,279 | 12/1985 | Shaw et al. | 350/96.15 |
| 4,564,262 | 1/1986 | Shaw | 350/96.15 |

FOREIGN PATENT DOCUMENTS 0069054  1/1983  European Pat. Off. ......... 350/96.15

OTHER PUBLICATIONS

"Energy Interchange Between Waves in Quadrupolar Pump Fields," by E. I. Gordon and A. Askin, *Journal of Applied Physics*, vol. 32, pp. 1137-1144, Jun., 1961.

*Primary Examiner*—John Lee
*Attorney, Agent, or Firm*—Curtis, Morris & Safford

[57] ABSTRACT

A channel add/drop filter-coupler includes two single-mode optical fibers that have different refractive index profiles. Each optical fiber has a propagation constant that is a function of frequency. A portion of the cladding of each fiber is removed to form a planar surface on each fiber. A plurality of channels is formed in one or both of the planar surfaces. The channels are spaced with a predetermined channel period that is inversely proportional to the difference between the propagation constants of the two fibers of the filter-coupler at the desired center frequency of the filter-coupler. The filter-coupler is completed by joining the two fibers at the planar surfaces. The coupling of the filter-coupler may be tuned by moving one fiber longitudinally, angularly, or, preferably, laterally with respect to the other fiber. Furthermore, the filter response of the filter-coupler is advantageously shaped by varying the location of the channels within the predetermined channel periods or by varying the depth or the width of the channels.

35 Claims, 20 Drawing Figures

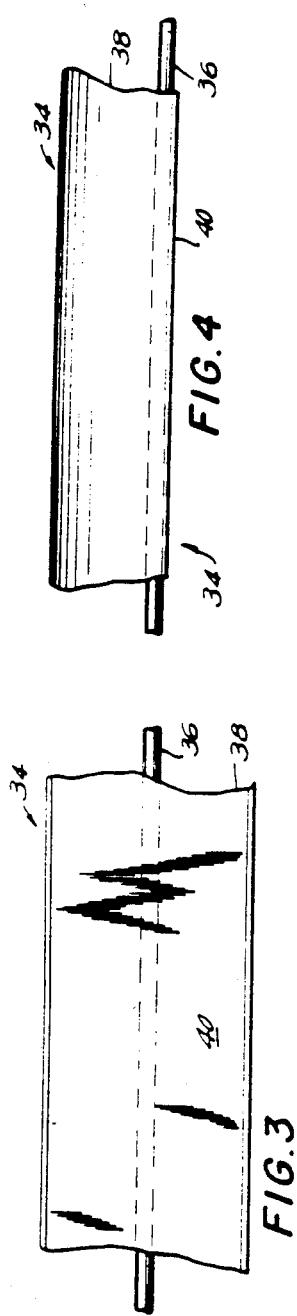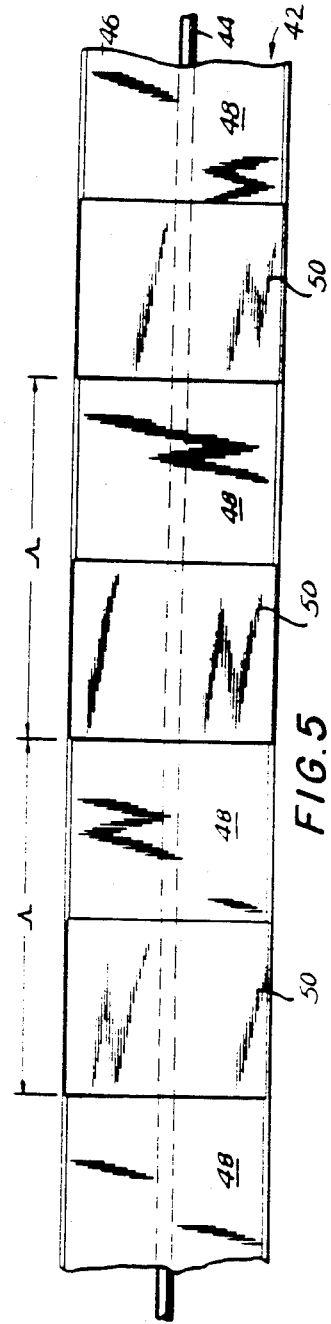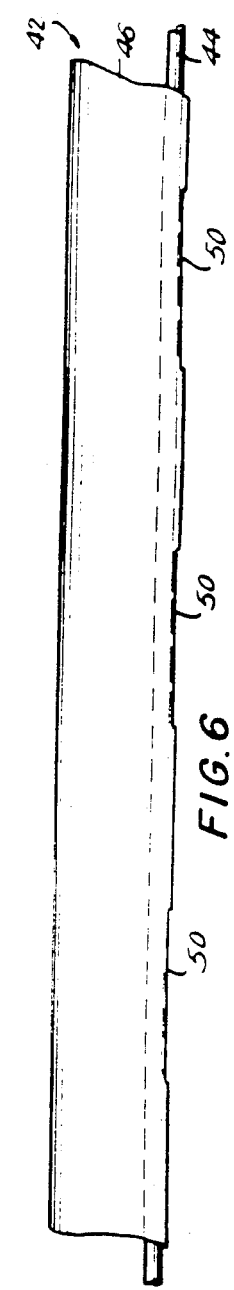

CHANNEL ADD/DROP FILTER-COUPLER

BACKGROUND OF THE INVENTION

The present invention relates, in general, to devices for fiber optical communication systems. More particularly, it pertains to filters and directional couplers for such systems.

Fiber optical communication systems employ extremely thin fibers of glass, plastic, or other transparent materials. The fibers are dielectric waveguides that are used to transmit electromagnetic energy at optical wavelengths. Optical fibers are broadly classified into two groups: single-mode fibers and multimode fibers. Dispersion, which is the spreading or widening of light pulses traveling along the guide, is considerably smaller in single-mode fibers than in multimode fibers. Since dispersion limits the number of pulses per second that may be transmitted on a fiber of a given length, single-mode fibers must be utilized in fiber optical communications systems with very high bandwidths, specifically, greater than 200 MHz, and for long spans, specifically, greater than 10 km.

Multiplexing, which is the simultaneous transmission of two or more signals or channels over the same transmission medium, promotes the efficient use of a transmission medium by more completely using the available bandwidth. Frequency-division multiplexing ("FDM"), or wavelength-division multiplexing ("WDM") as this technique is referred to in the optical fiber art, is one technique that may be employed to increase the information-carrying capacity of an optical fiber. A number of devices for introducing several distinct optical signals into a single optical fiber and removing them from the far end have been suggested.

For example, a paper entitled "Wavelength Division Multiplexing (WDM) Couplers," which was published in *Fiber Optics—Technology '82*, SPIE Vol. 326, pages 76–82, discusses and illustrates several optical couplers that may be employed for wavelength-division multiplexing and demultiplexing on multimode fibers. In this paper, FIG. 2 shows a lensed dichroic filter type coupler; FIG. 3 illustrates a prism type coupler; FIG. 4 depicts a diffraction grating type coupler. In addition, Table 3 lists the advantages and disadvantages of these couplers.

Furthermore, the Dec. 15, 1983, issue of *Applied Optics* discloses, on pages 3913 and 3916, an optical coupler that includes an optical fiber incorporating a diffraction grating. The grating coupler couples signals into and out of an optical fiber, which may be a single-mode fiber. Signals with different wavelengths enter and leave fibers placed at different angles. FIG. 4 on page 3916 shows two variations of the diffraction grating on the optical fiber: In one variation, the grating is formed on a flat grating substrate, which was obtained by mechanically polishing the cladding, while in the other variation, the grating is formed on a cylindrical grating substrate, which was obtained by chemically etching the cladding.

Because of their lenses, mirrors, gratings, and other mechanical components, the devices described above require precise alignments and tight tolerances, hence the attenuation, and therefore the performance, of such devices are unsatisfactory. To obtain and maintain such precise alignments and tight tolerances is often difficult. Moreover, these requirements impose restrictions on the temperature range of such devices. Additionally, due to the complicated mechanical arrangement that must be employed, only a limited number of signals may be multiplexed and demultiplexed with some of the devices. Consequently, other approaches, such as the use of optical directional couplers, have been suggested.

For instance, a paper entitled "Optical Directional Couplers with Variable Spacing," by Talal Findakly and Chin-Lin Chen, which was published in *Applied Optics*, Volume 17, Number 5, dated Mar. 1, 1978, shows an optical directional coupler with a linearly increasing channel spacing in FIG. 1. The waveguides in the coupler are identical dielectric strips, which are positioned on a $LiNbO_3$ substrate. This paper generally discusses optical directional couplers that have a variable separation between the waveguides. In such structures, power is coupled efficiently from one guide to the adjacent one provided the propagation constants are identical so that the optical phases remain in step (matched) over the full interaction path.

A paper entitled "Wavelength Selective Distributed Coupling Between Single Mode Optical Fibers for Multiplexing," by O. Parriaux, F. Bernoux, and G. Chartier, which was published in the *Journal of Optical Communications*, Volume 2, Number 3, indicates that a filter-type optical directional coupler may be fabricated from two polished single-mode fibers that have different intersecting dispersion characteristics. FIG. 1 of this paper illustrates a coupler having two step-index, single-mode fibers with different core radii and index differences.

A paper entitled "Tunable Optical Waveguide Directional Coupler Filter," by R. C. Alferness and R. V. Schmidt, which was published in *Applied Physics Letters*, Volume 33, Number 2, dated July 15, 1978, schematically depicts an optical waveguide directional coupler filter in FIG. 1. The coupler filter is described as being compatible with single-mode fiber systems and suitable for wavelength-division multiplexing and demultiplexing. The coupler filter includes a coupled pair of strip waveguides that have distinct indexes of refraction. The indexes of refraction have intersecting dispersion curves, as in the paper by Parriaux et al. The coupler filter also includes electrodes located over the waveguides; the center wavelength of the coupler filter is tuned by applying voltage to the electrodes in order to change the difference in the indexes of refraction of the waveguides.

R. C. Alferness and Peter S. Cross describe, in an article entitled "Fiber Characteristics of Codirectionally Coupled Waveguides with Weighted Coupling," which was published in the *IEEE Journal of Quantum Electronics*, Volume QE-14, Number 11, dated November 1978, coupled optical waveguides with tapered coupling strength. This paper states that studies of corrugated optical waveguides have demonstrated that their filter response may be improved by smoothly weighting the corrugation depth. The adjustment and shaping of a filter's response is sometimes referred to as apodization. This article mentions several taper functions that may be employed to improve the filter response of coupled optical waveguides. FIGS. 1 and 6 of this paper include schematic diagrams of coupled optical waveguides. Furthermore, this article indicates that a phased-matched interaction resulting in a complete power transfer between the optical waveguides may be obtained at a specified wavelength by either (a) making the waveguide propagation constants, which are functions of the wavelength, equal at the specified wavelength or (b) using periodic spatial modulation of the waveguide propagation constants or the coupling coefficient.

The September 1969 issue of *The Bell System Technical Journal* includes a paper entitled "Some Theory and Applications of Periodically Coupled Waves," by Stewart E. Miller, which notes that a periodic magnitude variation of the coupling between two parallel-traveling optical waves having different phase constants can yield a complete power interchange between the two waves. This paper illustrates, in FIG. 2, two dielectric waveguides that are spatially coupled. The first dielectric waveguide has an index of refraction $n_1$, and the second dielectric waveguide has an index of refraction $n_2$. Dielectric sheets, which are labeled $n_3$, are spaced periodically between the two dielectric waveguides along the length of the coupling region L. This paper also illustrates, in FIG. 5, periodically coupled dielectric waveguides. Again, the first dielectric waveguide has an index of refraction $n_1$, and the second dielectric waveguide has an index of refraction $n_2$. The substrate has an index of refraction $n_s$, which is less than $n_1$ and $n_2$.

Michel Digonnet and H. J. Shaw, in a paper entitled "Wavelength Multiplexing in Single-Mode Fiber Couplers," which was published in *Applied Optics*, Volume 22, Number 3, dated Feb. 1, 1983, discuss wavelength-division multiplexing in single-mode optical fibers. They state that two approaches have been used to provide wavelength-selective coupling: The first approach relies upon the frequency dependence of optical coupling in couplers made of identical fibers; the second approach uses differential waveguide dispersion in couplers made of dissimilar fibers. They note that R. C. Alferness and Peter S. Cross, in the paper mentioned above, theoretically analyzed the second approach for the case of channel waveguide couplers. Their paper describes the wavelength multiplexing characteristics of devices fabricated based upon the first approach, namely, with identical fibers. In particular, their paper shows a coupler that includes two planar substrates, each of which is a polished quartz block with a narrow slot in one face. Each slot, which is concave, receives an optical fiber. FIG. 4 of this paper illustrates the geometry of the coupler. They indicate that the coupler may be tuned by increasing the center-to-center spacing between the fibers or by laterally offsetting the fibers.

A paper entitled "Filter Response of Nonuniform Almost-Periodic Structures," by H. Kogelnik, which was published in *The Bell System Technical Journal*, Volume 55, Number 1, on Jan. 1, 1976, generally discusses the filter characteristics of nonuniform periodic waveguides and contradirectional waves. This paper states that the filter response may be altered by a gradual tapering in the corrugation or grating strength or by a gradual variation of the effective grating period.

Conventional optical directional couplers have several deficiencies. First, coupling losses are large when a fiber with cylindrical geometry is coupled to a directional coupler with rectangular geometry. Second, known directional couplers are not particularly frequency selective. Consequently, they may be used to multiplex and demultiplex only a few signals in a fiber with a limited bandwidth since the spectral widths of the coupled and uncoupled signals will be large.

Accordingly, a need exists for a low-loss, narrow-band coupler for fiber optical communication systems that enables signals with small spectral widths to be multiplexed and demultiplexed.

SUMMARY OF THE INVENTION

The present invention solves the problems associated with conventional devices and satisfies the need for a low-loss, narrow-band coupler for fiber-optical communication systems. Moreover, the present invention provides a channel add/drop filter-coupler that is compatible with existing fiber optical communication systems. Such a filter-coupler permits signals with small spectral widths to be added to (multiplexed) and dropped from (demultiplexed) an optical fiber, including single-mode fibers. The use of several such filter-couplers, therefore, allows several signals to be sent along a single-mode fiber, thereby increasing the amount of information transmitted. And inasmuch as the major portion of the total cost of a system consists of the expenses for procuring and installing fibers or cables, several such filter-couplers may be arranged at the ends of an existing system to greatly increase its information-carrying capacity without dramatically changing its total cost.

A filter-coupler according to the present invention has other applications and advantages. For instance, several such filter-couplers may be used with a variable-frequency optical source so that specific terminals of a system may be selectively addressed. Furthermore, such a filter-coupler may be employed in source sparing applications as a replacement for an electromechanical switch. In addition, such a filter-coupler may be utilized to combine the power of optical signals from two sources and enable the combined signal to travel farther.

The present invention overcomes the disadvantages of known devices by providing a channel add/drop filter-coupler that includes a first single-mode optical fiber with a core and cladding. The cladding of the first optical fiber has a substantially planar surface. The channel add/drop filter-coupler also includes a second single-mode optical fiber with a core and cladding. The cladding of the second optical fiber has a substantially planar surface. Each optical fiber has a refractive index profile, and the refractive index profiles are different. Furthermore, each optical fiber has a propagation constant that is a function of frequency, and these functional relationships are different. As a result, at any given frequency the propagation constants differ. A plurality of channels is formed in the planar surface of the first optical fiber. The channels are spaced with a predetermined channel period, which is substantially inversely proportional to the difference between the propagation constants at the design frequency, i.e., the desired center frequency, of the filter-coupler. The optical fibers are joined at the planar surfaces to complete the filter-coupler.

As indicated above, the first and second optical fibers have different refractive index profiles. The difference in the refractive index profiles may be effected in a variety of ways. Specifically, it may be achieved by selecting a first optical fiber with a core having a radially constant refractive index and by selecting a second optical fiber with a core having a radially constant refractive index, where the refractive indexes are different. Alternatively, the difference in the refractive index profiles may be obtained by selecting optical fibers with cores whose refractive indexes vary radially at different rates. Another manner in which it may be obtained is by choosing cores with different radii; the refractive indexes of the cores may be radially constant, even equal, or they may be radially varying.

The filter response of a channel add/drop filter-coupler in accordance with the invention may be shaped. Several methods may be employed to shape the filter response. For example, the channels may be located nonuniformly within the predetermined channel periods along the first optical fiber, or the width or the depth of the channels may be varied along the first optical fiber. The location of the channels within the predetermined channel periods or the width of the channels or the depth of the channels is advantageously varied in accordance with a truncated sinc function in order to shape the filter response.

A channel add/drop filter-coupler in accordance with the invention may be tuned to achieve perfect coupling at the design frequency. Tuning may be accomplished by moving one fiber laterally, longitudinally, or angularly with respect to the other fiber. Tuning is preferably accomplished by moving one fiber laterally with respect to the other fiber since lateral displacement does not decrease the interaction length and since lateral displacement advantageously allows greater tuning sensitivity than some of the other tuning techniques.

A plurality of channels may be formed in the planar surface of the cladding of the second optical fiber. The channels are spaced with the predetermined channel period. A channel add/drop filter-coupler with this feature may be tuned by using any of the previously mentioned methods.

The present invention includes a method of making a channel add/drop filter-coupler from a first single-mode optical fiber having a core and cladding and a second single-mode optical fiber having a core and cladding, where the refractive index profiles of the first and second optical fibers are different and where the propagation constants of the first and second optical fibers are functions of frequency. Initially, a portion of the cladding of the first optical fiber is removed to form a first planar surface, and a portion of the cladding of the second optical fiber is removed to form a second planar surface. A plurality of channels is then produced in one of the first and second planar surfaces. The channels are spaced with a predetermined period that is substantially inversely proportional to the difference between the propagation constants at the design frequency of the filter-coupler. Next, the optical fibers are joined at the first and second planar surfaces. The filter-coupler may be tuned by moving one fiber laterally, longitudinally, or angularly with respect to the other fiber.

The planar surfaces may be formed by mechanically or chemically removing a portion of the cladding, and the channels are preferably produced by photolithography. Furthermore, the filter response of the filter-coupler is advantageously shaped by varying the location of the channels within the predetermined channel periods or by varying the depth or the width of the channels.

BRIEF DESCRIPTION OF THE DRAWINGS

The above and other features and advantages of the present invention will become apparent upon consideration of the following detailed description of illustrative embodiments thereof, especially when taken in conjunction with the accompanying drawings, wherein:

FIG. 3 is a fragmentary bottom plan view of an optical fiber without channels;

FIG. 4 is a fragmentary side elevational view of the optical fiber shown in FIG. 3;

FIG. 5 is a fragmentary bottom plan view of an optical fiber with a plurality of channels;

FIG. 6 is a fragmentary side elevational view of the optical fiber shown in FIG. 5;

DETAILED DESCRIPTION OF THE PREFERRED EMBODIMENTS

Figure 1:
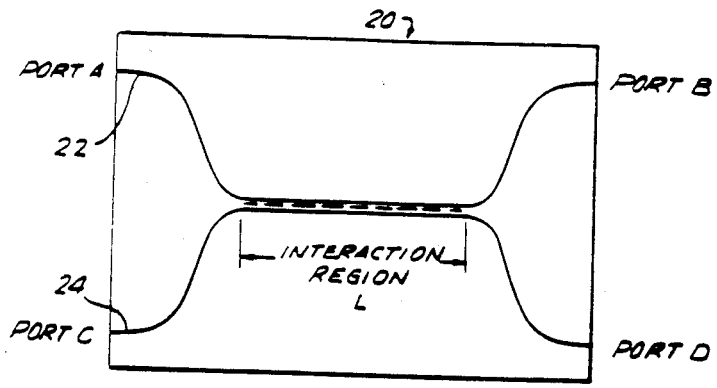
FIG. 1 is a diagrammatic illustration of a channel add/drop filter-coupler.

Referring now to the drawings, and specifically to FIG. 1, a channel add/drop filter-coupler according to the invention is shown diagrammatically and designated by the reference numeral 20. The filter-coupler 20 is a four-port device with ports A, B, C, and D. The filter-coupler 20 has two single-mode optical fibers 22 and 24, which are brought together along an interaction region of length L. The interaction region is schematically illustrated in FIG. 1 by the dashed line. The following description will explain that optical signals with a specified frequency are coupled from port A to port D or from port D to port A, depending upon the direction of propagation. Similarly, optical signals at the specified frequency are coupled from port C to port B or from port B to port C, depending upon the direction of propagation. Optical signals not having the specified frequency are coupled from port A to port B or from port C to port D or vice versa, depending upon their direction of travel.

Figure 2:
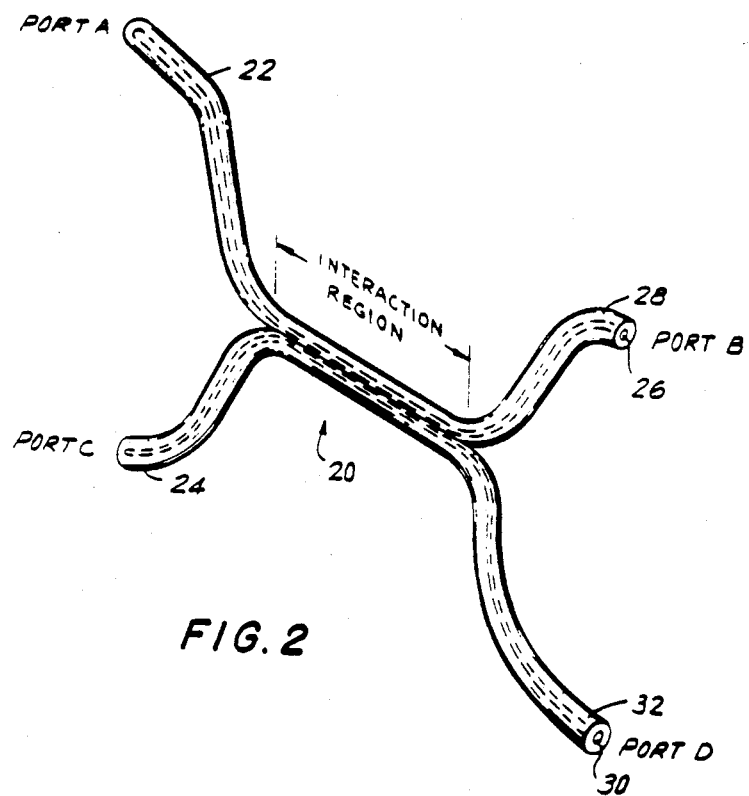
FIG. 2 is another diagrammatic illustration of a channel add/drop filter-coupler.

FIG. 2 schematically shows a filter-coupler 20 according to the present invention. Again, the two optical fibers 22 and 24 are joined along the interaction region. The optical fiber 22 has a core 26, which is denoted by two dashed lines, and cladding 28; the optical fiber 24 has a core 30, which is also denoted by two dashed lines, and cladding 32. The optical fibers 22 and 24 have refractive index profiles that are different, as is indicated in greater detail below. Necessarily, the optical fibers 22 and 24 are each single-mode fibers.

Figures 9, 10:
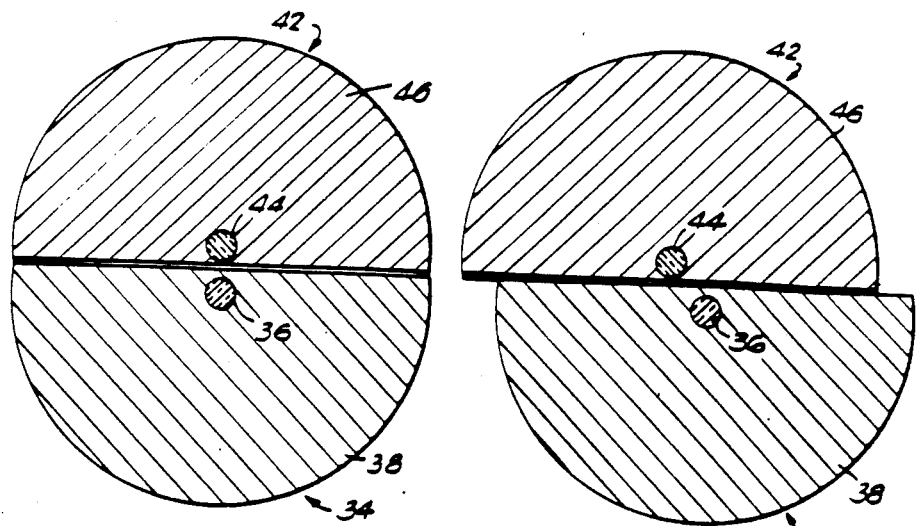
FIG. 9 is an enlarged sectional view of a channel add/drop filter-coupler.
FIG. 10 is an enlarged sectional view of the channel add/drop filter-coupler shown in FIG. 9 and illustrates a technique for tuning the filter-coupler.

As noted above, a channel add/drop filter-coupler according to the invention is constructed from two optical fibers. FIGS. 3 and 4 show one optical fiber that may be used, while FIGS. 5 and 6 show another optical fiber that may be used. The optical fiber 34 illustrated in FIGS. 3 and 4 is a single-mode fiber with a core 36 and cladding 38. A portion of the cladding 38 has been removed to form a planar surface 40. The optical fiber 42 illustrated in FIGS. 5 and 6 is also a single-mode fiber with a core 44 and cladding 46. A portion of the cladding 46 has been removed to form a planar surface 48. Additionally, a plurality of channels 50 has been formed in the planar surface 48. The longitudinal axes of the channels 50 are substantially perpendicular to the core axis of the fiber 42. The channels are spaced with a predetermined period, which is designated by the symbol $\Lambda$. The filter-coupler is completed by joining the fibers 34 and 42 at the planar surfaces 40 and 48. FIG. 9 is a sectional view of the fibers 34 and 42 in a completed filter-coupler.

The planar surfaces 40 and 48 may be formed by mechanically or chemically removing a portion of the cladding 38 and 46, respectively. However, the planar surfaces are preferably formed by applying a chemical etching agent to the cladding and then rubbing, but not abrasively rubbing, the cladding to remove the residue. A light source, such as a visible-light laser, is advantageously employed to introduce light into the optical fiber core. The cladding is removed until the scattered optical signal is detected at the planar surface. This indicates that the planar surface is within a few microns of the core-cladding boundary. In addition, the channels 50 may be produced by photolithography.

Figure 8A:
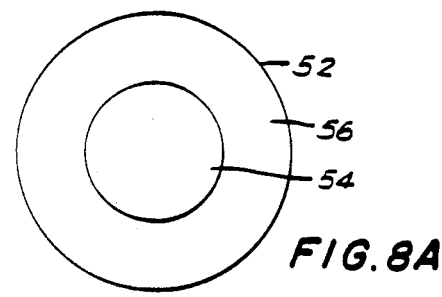
FIG. 8A is a sectional view of an optical fiber with the diameter of the core exaggerated.
Figure 8B:
FIG. 8B is an example of a refractive index profile for the optical fiber shown in FIG. 8A.
Figure 8C:
FIG. 8C is another example of a refractive index profile for the optical fiber shown in FIG. 8A.
Figure 8D:
FIG. 8D is yet another example of a refractive index profile for the optical fiber shown in FIG. 8A.
Figure 8E:
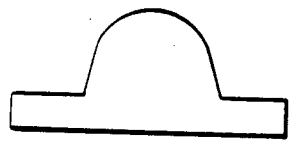
FIG. 8E is still another example of a refractive index profile for the optical fiber shown in FIG. 8A.

The two fibers 34 and 42 must have different refractive index profiles. FIG. 8A depicts an optical fiber 52, including a core 54 and cladding 56, while FIGS. 8B through 8E depict various refractive index, or index of refraction, profiles for the optical fiber of FIG. 8A. The core 54 of the fiber 52 is exaggerated for ease of illustration and instruction. FIGS. 8B and 8C show refractive index profiles for step-index fibers, and FIGS. 8D and 8E show refractive index profiles for graded-index fibers. The profiles shown in FIGS. 8B and 8C are radially constant in the core, but they have different magnitudes. The profiles shown in FIG. 8D, which are denoted by the solid and dashed lines, vary radially in the core, but they vary at different rates. Finally, the profile shown in FIG. 8E varies radially with a nonconstant gradient.

The core of a fiber with the profile of FIG. 8B has a lower index of refraction than the core of a fiber with the profile of FIG. 8C. Accordingly, the two fibers may be employed to construct a filter-coupler according to the invention. Also, a fiber having the profile indicated by the solid line in FIG. 8D may be used with a fiber having the profile indicated by the dashed line in FIG. 8D to fabricate a filter-coupler. Alternatively, a fiber having the profile shown in either FIGS. 8B or 8C may be utilized together with a fiber having one of the profiles shown in FIG. 8D to form a filter-coupler. Similarly, a fiber with one of the profiles shown in FIGS. 8B through 8D and a fiber with the profile shown in FIG. 8E may be employed to make the filter-coupler. A further alternative is to use two fibers that have cores with different radii; the magnitudes of the indexes of refraction of the cores may be different or they may be equal. It is essential that whatever the profile, the fiber supports only the lowest order mode.

As mentioned above, the two fibers of the filter-coupler must have different refractive index profiles. Consequently, the two fibers have different propagation constants, and optical signals at a given frequency travel with different phases along the different fibers of the filter-coupler. In order to produce coupling between the two waves at the given frequency, the coupling strength between the two fibers (or coupling coefficient) is periodically varied along the interaction region. In a device according to the present invention, the coupling strength between the two fibers is periodically varied by forming channels that are spaced with a predetermined period in one or both of the fibers of the filter-coupler. The periodic variation in the coupling strength is such that it causes the energy in one fiber to scatter coherently in phase into the other fiber. The interaction is cumulative along the region of the periodic variation. Accordingly, the energy in one fiber is transferred to the other. A similar type of phenomenon is described in a paper entitled "Energy Interchange Between Waves in Quadrupolar Pump Fields," by E. I. Gordon and A. Ashkin, which was published in the *Journal of Applied Physics*, Volume 32, pages 1137–1144, June, 1961, the disclosure of which is hereby incorporated herein by reference.

If the propagation constants of the cores of the first and second fibers of the filter-coupler are denoted by $B_1$ and $B_2$, respectively, the relationship between the channel period $\Lambda$ and the difference between the propagation constants may be expressed by Equation 1, below:

$$B_1 - B_2 = 2(\text{pi})/\Lambda \qquad \text{Eq. 1}$$

The propagation constant of a single-mode fiber is a function of the frequency of the signal traveling through the fiber. The propagation constant of a fiber may be expressed as a function of frequency as set forth in Equation 2, which follows, where $v_p$ is the phase velocity of the signal:

$$B(f) = 2(\text{pi})f/v_p \qquad \text{Eq. 2}$$

Equations 1 and 2 show that power is transferred between the two fibers at a frequency $f_o$, when the following condition is met:

$$f_o = [|1/v_{p2} - 1/v_{p1}|\Lambda]^{-1} \qquad \text{Eq. 3}$$

Accordingly, the frequency $f_o$ is the optimum frequency for coupling. The frequency $f_o$ is the center frequency of the pass band for the filter-coupler, and it is referred to as the design frequency of the device. Furthermore, complete power transfer occurs at the frequency $f_o$ when the following condition is satisfied, where K is the coupling parameter, which depends on the overlap of the fields of the signals in the fibers and the degree of variation in the coupling strength, and L is the length of the interaction region:

$$KL = (\pi)/2 \qquad \text{Eq. 4}$$

The coupling decreases significantly for frequencies other than the frequency $f_o$ when the condition specified in Equation 5 is satisfied:

$$|B_1 - B_2 - 2(\pi)/\Lambda|L > (\pi) \qquad \text{Eq. 5}$$

The allowed frequency excursion, therefore, may be derived from Equations 3 and 5 and expressed as follows:

$$|f - f_o| = \tfrac{1}{2}(\Lambda/L)f_o \qquad \text{Eq. 6}$$

If the bandwidth of the filter-coupler is defined as the frequency band between the frequencies at which half of the power of a signal is transferred, the bandwidth, $\Delta f$, may be represented by the following relationship:

$$\Delta f = f_o(\Lambda/L) \qquad \text{Eq. 7}$$

In effect, the interaction fraction bandwidth, $\Delta f/f_o$, is the inverse of the number of etched channels along the interaction path.

Referring to FIGS. 3–6, they may be used to provide an example of the dimensions involved with a filter-coupler according to the invention with a design or center frequency $f_o$ equal to $2.31 \times 10^{14}$ Hertz, which corresponds to a wavelength of 1.3 micrometers. The outer diameter of the single-mode fibers 34 and 42 may be approximately 100 micrometers, while the outer diameter of the cores 36 and 44 may be approximately 7 micrometers. The distance between the planar surface 40 and the outer periphery of the core 36 may be about 1.5 micrometers. The distance between the planar surface 48 and the outer periphery of the core 44 may also be about 1.5 micrometers. The depth of the channels 50, i.e., their distance below the planar surface 48, may be approximately 1 micrometer. Accordingly, the distance between the bottom of the channels 50 and the outer periphery of the core 44 is about 0.5 micrometers. If, however, channels are formed in both of the fibers, the depth of the channels may be approximately 0.5 micrometers. Furthermore, the channel period $\Lambda$ may be about 173 micrometers, and the width of each channel is one half of the channel period. Finally, the interaction region L is approximately 10 centimeters.

A filter-coupler constructed as specified in the preceding paragraph is a directional coupler that includes a bandpass characteristic. In a narrow, predetermined (by design and construction) frequency band, the filter-coupler acts like a zero-db directional coupler. Outside this band, the coupled power is low. A filter-coupler according to the invention may be designed and constructed to have a half-power to half-power wavelength spacing of approximately 2.5 nanometers. Accordingly, filter-couplers according to the invention may be used to multiplex and demultiplex a number of narrowband signals on a single-mode fiber, which is low loss in the range 1200–1600 nm. This application for filter-couplers according to the invention is explained in greater detail below.

The channels 50 in FIGS. 5 and 6 are spaced with channel period $\Lambda$. The channels 50 are uniformly located within the channel periods. That is, a channel in one period is positioned in the same place as a channel in another period with respect to the beginning of the associated channel period. In other words, each channel has a constant phase with respect to the associated channel period. Furthermore, the width and the depth of the channels 50 are constant or uniform along the fiber 42. Thus, the coupling is uniform in amplitude and phase.

However, in order to shape or apodize the filter response of the filter-coupler and achieve better performance, the location of the channels within the channel periods may be varied. Alternatively, the depth or the width of the channels may be varied along the optical fiber. But no matter which technique is employed, the channels have an average periodicity of $\Lambda$. For instance, at one point along the interaction region, a channel may begin at the left edge of the associated period and end at the middle of that particular period, while at another point along the interaction region, a channel may begin in the middle of the associated period and end at the right edge of that particular channel period. This shift in the position of the channels produces a 180-degree phase shift in the coupling parameter. Similarly, the depth or the width of the channels may be varied. But even if the width of the channels is varied so that at one extreme of the coupling parameter the channel width equals half of the channel period and at the other extreme of the coupling parameter the channel width equals zero, by definition the channels are spaced with the channel period $\Lambda$.

Figure 7:
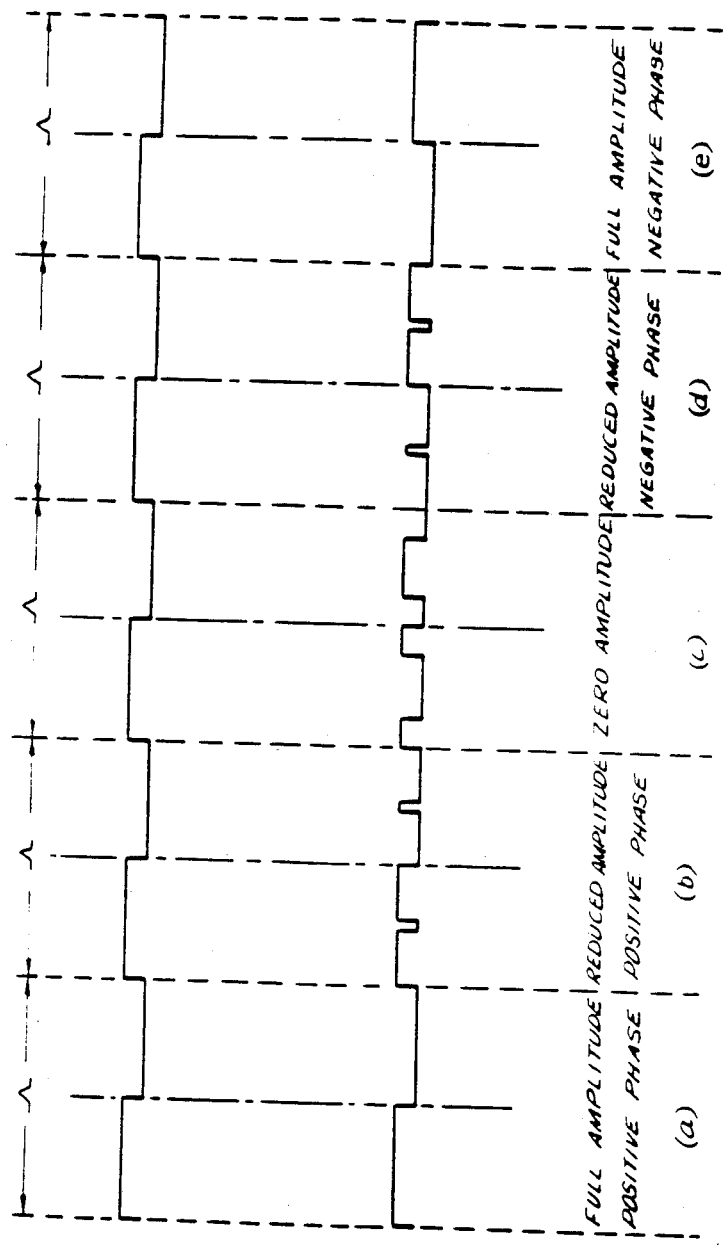
FIG. 7 is a schematic representation of modified channel configurations.

FIG. 7 is a schematic representation of modified channels. Such channels may be employed in a filter-coupler with an apodized response. The upper portion of FIG. 7 represents channels that are uniformly located within the channel periods, while the lower portion of FIG. 7 represents channels that produce modified coupling. The dashed lines denote the channel periods. FIG. 7(a) depicts a channel configuration that results in coupling with a full amplitude and a positive phase. This channel arrangement is the same as those shown in the upper portion of FIG. 7. FIG. 7(b) illustrates a channel configuration that results in coupling with a reduced amplitude and a positive phase. FIG. 7(c) shows a channel configuration that results in coupling with a zero amplitude, i.e., no effective coupling. FIG. 7(d) depicts a channel configuration that results in coupling with a reduced amplitude and a negative phase. Finally, FIG. 7(e) illustrates a channel configuration that results in coupling with a full amplitude and a negative phase.

In FIGS. 7(a)–(e), each channel arrangement is antisymmetrical about the center of the associated channel period. (The center of a channel period is indicated by a line with long and short dashes.) That is, a raised portion in one half of the channel period corresponds to a lowered portion in the other half of the channel period. This method of channel modification permits the amplitude and the phase of the coupled energy to be selectively varied. The amplitude of the coupled energy may even be reduced to zero, e.g., by the channel structure shown in FIG. 7(c). Furthermore, this method of channel modification avoids spurious couplings of the filter-coupler since the average value of the coupling is the same for each of the channel structures illustrated in FIGS. 7(a)–(e).

In practice, the channel configurations depicted in FIGS. 7(a)–(e) are not adjacent to one another. Rather, the channel configurations vary gradually from one channel period to the next. Preferably, the channel arrangements are modified in accordance with a predetermined shaping function, such as a truncated sinc function.

Figure 11:
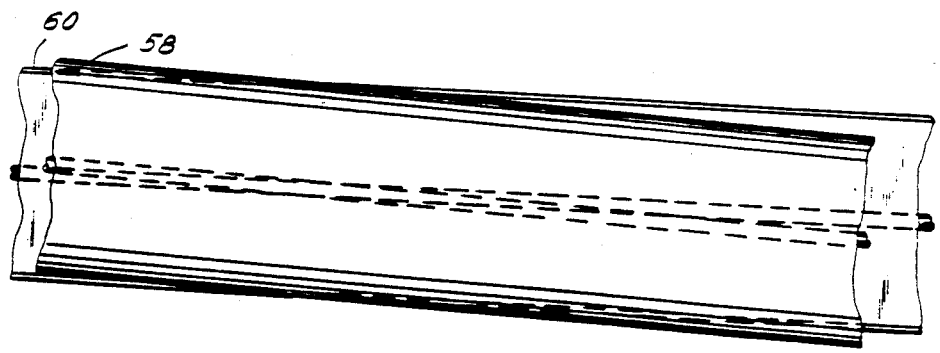
FIG. 11 is a fragmentary top plan view of another channel add/drop filter-coupler and illustrates another technique for tuning the filter-coupler.

As mentioned before, FIG. 9 is a sectional view of the fibers 34 and 42 after they are joined at their planar surfaces. Once the channels are etched and the fibers are joined, the fraction of energy transferred or the coupling of the filter-coupler may be tuned to achieve the condition of Eq. 4. Tuning of the coupling factor may be accomplished in a number of ways. One fiber may be moved laterally, longitudinally, or angularly with respect to the other fiber to tune the filter-coupler, or two or more of these movements may be made together. FIG. 10, for example, illustrates one technique for tuning the filter-coupler. In FIG. 10, the fiber 42 is displaced laterally with respect to the fiber 34. FIG. 11 depicts another technique for tuning a filter-coupler. In FIG. 11, a fiber 58 is displaced angularly with respect to a fiber 60. The angular displacement is exaggerated in FIG. 11 in order to conveniently show the concept of tuning by angular displacement. Preferably, the filter-coupler is tuned by laterally moving one fiber with respect to the other fiber. Lateral displacement is preferable since, as Equation 7 indicates, lateral displacement does not change the bandwidth of the filter-coupler, as do longitudinal and angular displacement, which change the interaction length L. Additionally, lateral displacement is easier to accomplish with known device configurations.

The filter-coupler described above couples codirectional waves. However, the principles underlying such a filter-coupler may be employed to design and construct a filter-coupler that couples contradirectional waves. But the channel period of a filter-coupler that couples contradirectional waves is much shorter than the channel period of a filter-coupler that couples codirectional waves, as Equation 1 indicates. Contradirectional coupling does not produce a complete energy transfer in a finite interaction length, that is, a zero-db coupler is not possible.

Figure 12:
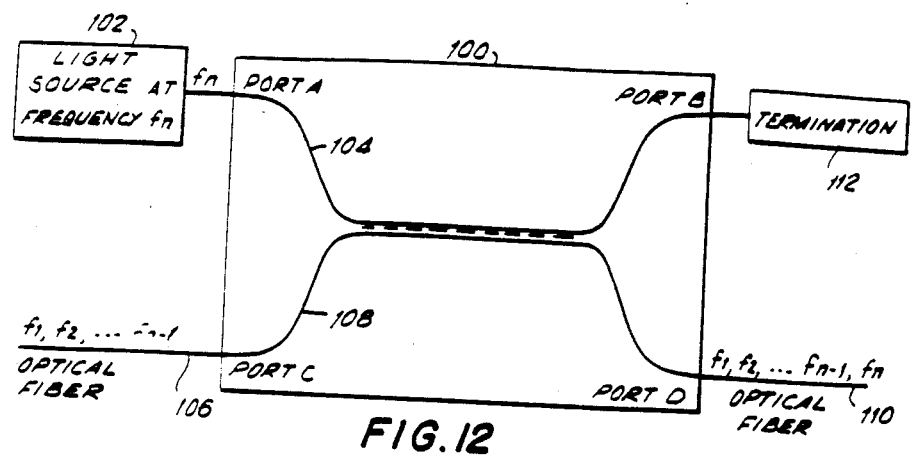
FIG. 12 is a schematic diagram of a system with a channel add/drop filter-coupler that is used to add a channel.
Figure 13:
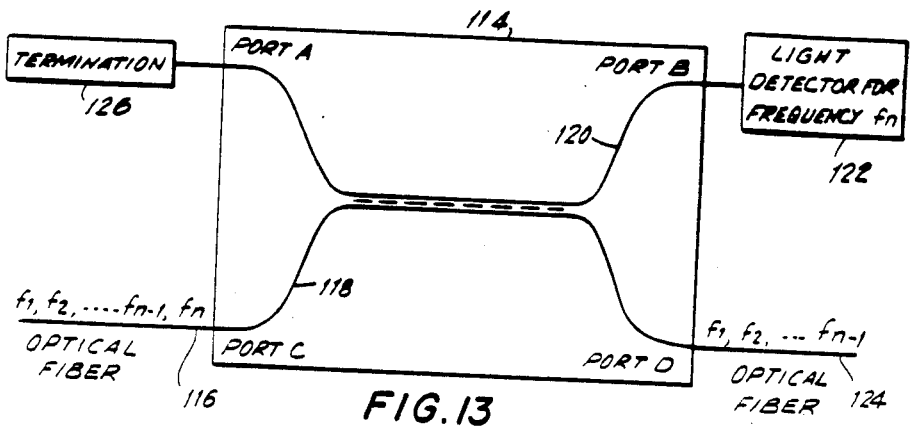
FIG. 13 is a schematic diagram of a system with a channel add/drop filter-coupler that is used to drop a channel.

A filter-coupler according to the invention is advantageously employed in a variety of applications. FIGS. 12 and 13 illustrate two such applications, specifically, multiplexing and demultiplexing. In FIG. 12, a filter-coupler 100 is used to add a channel (at frequency $f_n$) to an optical fiber, which is already carrying other channels. A light source 102 produces an optical signal with a frequency $f_n$, and this optical signal is introduced into a fiber 104 of the filter-coupler 100 at port A. Optical signals with frequencies $f_1, f_2, \ldots f_{n-1}$ travel along an optical fiber 106 and are introduced into a fiber 108 of the filter-coupler 100 at port C. The filter-coupler is designed and constructed to couple optical signals at frequency $f_n$. Accordingly, the optical signal on the fiber 104 is transferred to the fiber 108. The combined signal leaves the filter-coupler 100 through port D and travels along an optical fiber 110. Port B of the filter-coupler 100 may be terminated by a suitable termination 112.

In FIG. 13, a filter-coupler 114 is used to drop a channel (at frequency $f_n$) from an optical fiber 116, which is also carrying other channels. Optical signals with frequencies $f_1, f_2, \ldots f_{n-1}, f_n$ travel along the optical fiber 116 and are introduced into one fiber 118 of the filter-coupler 114 at port C. The filter-coupler 114 is designed and constructed to couple optical signals at frequency $f_n$. Accordingly, the optical signal with frequency $f_n$ on the fiber 118 is transferred to the other fiber 120 of the filter-coupler 114, while the other optical signals continue to travel along the fiber 118. The optical signal on the fiber 120 leaves the filter-coupler 114 through port B. From port B, the optical signal may be detected by a light detector 122, for instance, or processed in some other manner. The other optical signals in the fiber 118 leave the filter-coupler 114 through port D and enter an optical fiber 124. Port A of the filter-coupler 114 may be terminated by a suitable termination 126.

Together, FIGS. 12 and 13 show a desirable feature of the invention: Identically constructed filter-couplers may be employed to either multiplex or demultiplex an optical signal at a specified frequency. In particular, if the filter-couplers 100 and 114 are fabricated to couple optical signals at frequency $f_n$, such signals are transferred from port A to port D in filter-coupler 100, which is used as a multiplexer, while such signals are transferred from port C to port B in filter-coupler 114, which is used as a demultiplexer. The devices 100 and 114 may be identical, and either device may be utilized as a multiplexer or demultiplexer depending upon the manner in which various signals are introduced into the fibers of the device.

Figure 14:
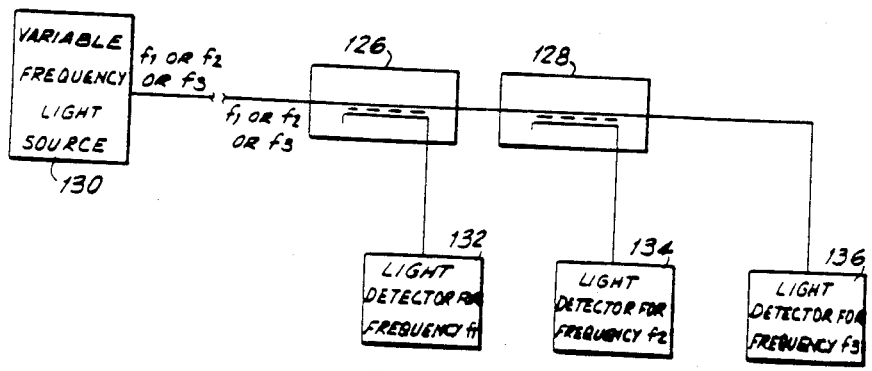
FIG. 14 is a schematic diagram of a system employing a variable-frequency light source and a plurality of channel add/drop filter-couplers.

FIG. 14 depicts another application for a filter-coupler according to the invention. In the system shown in FIG. 14, two filter-couplers 126 and 128 are used with a variable-frequency light source 130 to selectively address one of the light detectors 132, 134, and 136. The filter-coupler 126 is designed to transfer optical signals with frequency $f_1$, while the filter-coupler 128 is designed to transfer optical signals with frequency $f_2$. Consequently, by controlling the variable-frequency light source 130 to generate output optical signals at frequency $f_1$ or $f_2$ or $f_3$, one of the detectors 132 or 134 or 136 may respectively be addressed. The switching between different detectors may advantageously be accomplished without a control wire simply by varying the frequency of the output signals of the variable-frequency light source 130. An example of a variable-frequency light source is a temperature-dependent laser. By changing the temperature of the laser, the frequency of the output optical signals may be changed, and thus the appropriate detector may be selected. Another tuning means is the use of an electronically tunable filter within the laser cavity.

Figure 15:
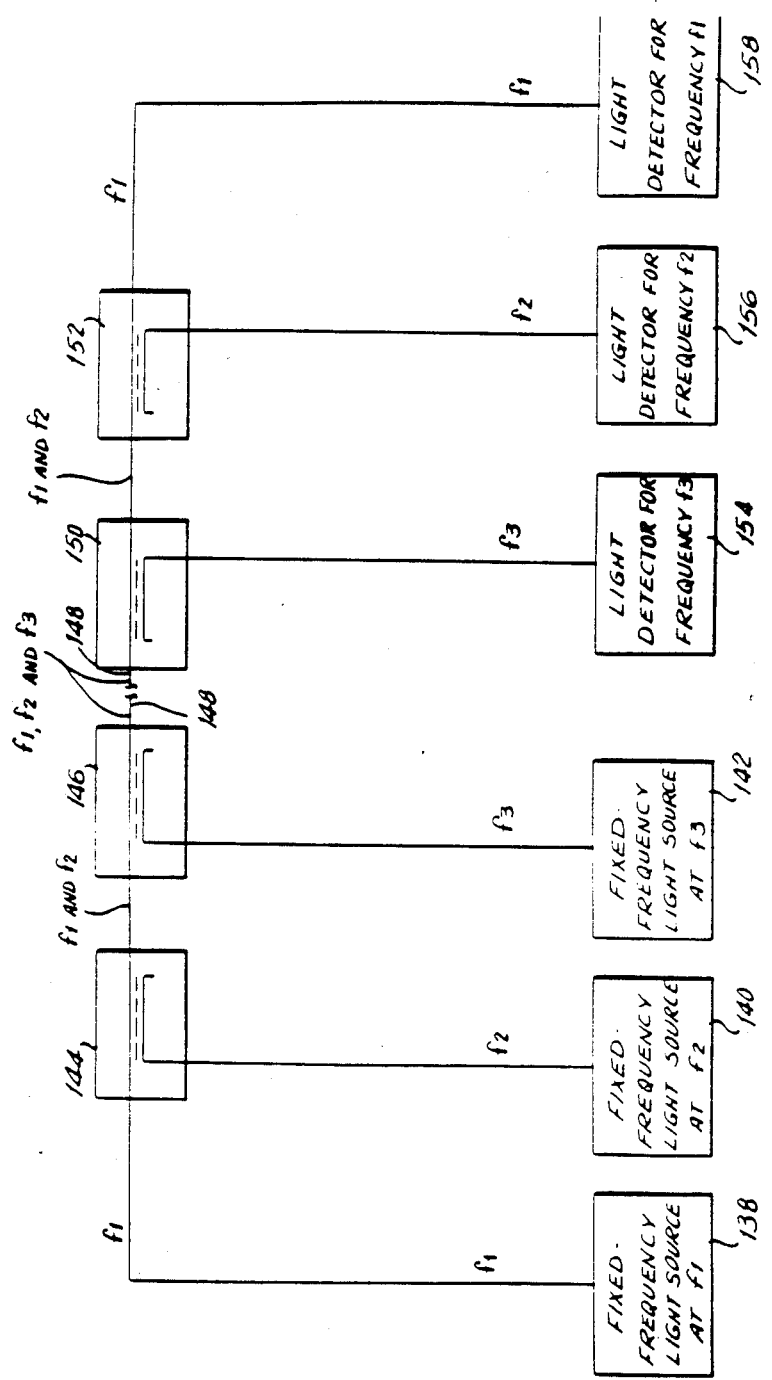
FIG. 15 is a schematic diagram of a system employing a plurality of fixed-frequency light sources and a plurality of channel add/drop filter-couplers.

An additional application for a filter-coupler according to the invention is illustrated in FIG. 15. In the system shown in FIG. 15, fixed-frequency light sources 138, 140, and 142 generate output optical signals at frequencies $f_1$, $f_2$, and $f_3$, respectively. A filter-coupler 144 is designed to transfer signals at frequency $f_2$, and a filter-coupler 146 is designed to transfer signals at frequency $f_3$. The filter-couplers 144 and 146 are connected as multiplexers in the system shown in FIG. 15. Accordingly, the filter-coupler 144 adds signals at frequency $f_2$ to signals at frequency $f_1$, and the filter-coupler 146 adds signals at frequency $f_3$ to the signals at frequencies $f_1$ and $f_2$. The light sources 138, 140, and 142 and the filter couplers 144 and 146 are located at the sending end of an optical fiber 148. The multiplexed signals $f_1$, $f_2$, and $f_3$ are transmitted from the sending end to the receiving end of the optical fiber 148.

A filter-coupler 150 and a filter-coupler 152 are located at the receiving end of the optical fiber 148. The filter-coupler 150 is designed to transfer signals at frequency $f_3$, and the filter-coupler 152 is designed to transfer signals at frequency $f_2$. The filter-couplers 150 and 152 are connected as demultiplexers in the system shown in FIG. 15. However, as noted previously, the filter-couplers 150 and 152 may be identical to the filter-couplers 146 and 144, respectively. The filter-coupler 150 transfers signals at frequency $f_3$ to a light detector 154, while the filter-coupler 152 transfers signals at frequency $f_2$ to a light detector 156. Signals at frequency $f_1$ are not transferred by either of the filter-couplers 150 and 152, and consequently such signals travel to a light detector 158.

The system illustrated in FIG. 15 may be used for sparing sources, i.e., for using back-up or redundant sources in order to improve the reliability of the system. Specifically, if the light source 138 is the primary light source and it fails, either of the back-up light sources 140 and 142 may be utilized to transmit signals to the receiving end of the system. The filter-couplers 144, 146, 150, and 152 enable the light sources 140 and 142 to be used by merely turning them on. The light detectors 154, 156, and 158 may be connected to the same signal processing circuitry. Accordingly, electromechanical switches, and the reliability problems associated with them, are eliminated. Additionally, if a broadband detector were employed, the other detectors at the receiving end and the associated filter-couplers would be unnecessary for source sparing applications. For instance, if the detector 158 was a broadband detector, i.e., one that could detect signals with frequencies $f_1$, $f_2$, and $f_3$, the filter-couplers 150 and 152 and the detectors 154 and 156 would not be required.

FIG. 15 offers an example of another application for a filter-coupler according to the invention. More particularly, if the filter-couplers 150 and 152 and the associated detectors 154 and 156 were absent, the light sources 138, 140, and 142 could be utilized together with the filter-couplers 144 and 146 to produce an optical signal with more power. The more powerful signal could travel farther along the fiber 148 before being attenuated to a specific level. Due to the increased signal power, the detector 158, which would be a broadband detector that detects signals at frequences $f_1$, $f_2$, and $f_3$, may be located farther from the sending end of the fiber 148. In certain circumstances, therefore, a repeater station may be unnecessary, whereas if conventional equipment were employed, a repeater station would be required. In other applications, e.g., optical memory devices where light from the end of the fiber is focused onto a rotating disc to write or read, increasing the power by a factor of two or more could be critically important.

The system shown in FIG. 15 exemplifies how filter-couplers according to the invention may be used with existing fiber optical communication systems to increase their information-carrying capacity. If the optical fiber 148 is an existing single-mode fiber that runs between the source 138 and the detector 158, only signals at frequency $f_1$ travel along it. Now, if the filter-couplers 144 and 146 and the sources 140 and 142 are retrofitted at the sending end and if the filter-couplers 150 and 152 and the detectors 154 and 156 are retrofitted at the receiving end, signals at frequencies $f_1$, $f_2$, and $f_3$ may be transmitted along the fiber 148. As a result, the amount of information flowing between the sending end and the receiving end of the fiber 148 may be increased by 200 percent.

Figure 16:
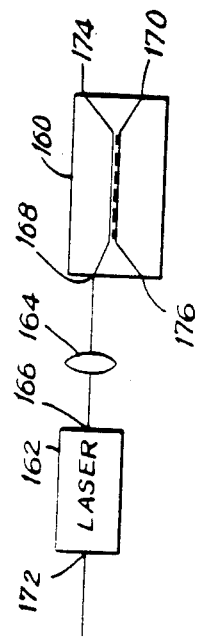
FIG. 16 is a schematic diagram of a laser and a channel add/drop filter-coupler used as a feedback reflector.

A feedback reflector for an optical device is depicted in FIG. 16. The feedback reflector employs a filter-coupler according to the invention. Specifically, a filter-coupler 160 is positioned proximate a narrow-spectrum laser or laser chip 162. A lens 164 focuses the optical signal emitted from a facet 166 of the laser chip 162 onto a port 168 of the filter-coupler 160. The facet 166 and the port 168 have antireflection coatings. A port 170 of the filter-coupler 160 has a reflection coating, while ports 174 and 176 of the filter-coupler 160 have antireflection coatings. Accordingly, optical signals at or near the design frequency of the filter-coupler 160 pass from the port 168 to the port 170, and then they are reflected by the port 170 back to the port 168. From the port 168, the optical signals pass through the lens 164 into the laser chip 162. The optical signals excite the laser chip 162, and an output optical signal is emitted from an output facet of the laser chip 162. Due to the narrow-band characteristics of the filter-coupler 160, the signal sent by it to the laser chip 162 has a tightly controlled frequency range. Consequently, the signal at the output facet 172 has a tightly controlled frequency range. Basically, the filter-coupler 160 acts as a reflector for optical signals at the facet 166 of the laser chip 162, but because of its construction, the filter-coupler 160 only reflects optical signals in a specific, narrow band. These signals excite the laser chip 162 and produce a narrowband output optical signal. The antireflection coatings on the ports 174 and 176 of the filter-coupler 160 are not essential; however, such coatings improve the filter characteristic of the feedback reflector.

Although particular illustrative embodiments of the present invention have been described herein with reference to the accompanying drawings, the present invention is not limited to these particular embodiments. Various changes and modifications may be made thereto by those skilled in the art without departing from the spirit or scope of the invention, which is defined by the appended claims.

I claim:

1. An optical filter-coupler for coupling optical signals at a design frequency, comprising:
   a first single-mode optical fiber with a first refractive index profile and a first propagation constant that is a function of frequency, the first optical fiber having a core and cladding, the cladding having a substantially planar surface;
   a second single-mode optical fiber with a second refractive index profile and a second propagation constant that is a function of frequency, the second optical fiber having a core and cladding, the cladding having a substantially planar surface;
   wherein the first refractive index profile is different than the second refractive index profile;
   wherein a plurality of channels is formed in the planar surface of the first optical fiber, the channels being spaced with a predetermined channel period, the channel period being substantially inversely proportional to the difference between the first propagation constant and the second propagation constant at the design frequency; and
   wherein the first optical fiber and the second optical fiber are joined at the planar surfaces.

2. An optical filter-coupler as recited in claim 1, wherein the core of the first optical fiber has a substantially radially constant first refractive index, the core of the second optical fiber has a substantially radially constant second refractive index, and the first and second refractive indexes are different.

3. An optical filter-coupler as recited in claim 1, wherein the core of the first optical fiber has a radially varying first refractive index, the core of the second optical fiber has a radially varying second refractive index, and the first and second refractive indexes vary at different rates.

4. An optical filter-coupler as recited in claim 1, wherein the core of the first optical fiber has a different diameter than the core of the second optical fiber.

5. An optical filter-coupler as recited in claim 4, wherein the core of the first optical fiber has a substantially radially constant first refractive index, the core of the second optical fiber has a substantially radially constant second refractive index, and the first and second refractive indexes are approximately the same.

6. An optical filter-coupler as recited in claim 1, wherein the channels are located substantially uniformly within the predetermined channel periods along the first optical fiber.

7. An optical filter-coupler as recited in claim 1, wherein the channels are located nonuniformly within the predetermined channel periods along the first optical fiber to shape the response of the filter-coupler.

8. An optical filter-coupler as recited in claim 7, wherein the channels are located within the predetermined channel periods in accordance with a truncated sinc function to shape the response of the filter-coupler.

9. An optical filter-coupler as recited in claim 1, wherein the channels have substantially the same depth along the first optical fiber.

10. An optical filter-coupler as recited in claim 1, wherein the channels have different depths along the first optical fiber to shape the response of the filter-coupler.

11. An optical filter-coupler as recited in claim 1, wherein the channels have substantially the same width along the first optical fiber.

12. An optical filter-coupler as recited in claim 1, wherein the channels have different widths along the first optical fiber to shape the response of the filter-coupler.

13. An optical filter-coupler as recited in claim 12, wherein the widths vary in accordance with a truncated sinc function to shape the response of the filter-coupler.

14. An optical filter-coupler as recited in claim 1, wherein a plurality of channels is formed in the planar surface of the cladding of the second optical fiber, the channels being spaced with the predetermined channel period.

15. An optical filter-coupler as recited in claim 1, further comprising means for tuning the filter-coupler.

16. An optical filter-coupler as recited in claim 15, wherein the tuning means includes means for moving one of the optical fibers laterally with respect to the other of the optical fibers.

17. An optical filter-coupler as recited in claim 15, wherein the tuning means includes means for moving one of the optical fibers longitudinally with respect to the other of the optical fibers.

18. An optical filter-coupler as recited in claim 15, wherein the tuning means includes means for moving one of the optical fibers angularly with respect to the other of the optical fibers.

19. An optical filter-coupler as recited in claim 1, wherein the channels have substantially the same width and substantially the same depth along the first optical fiber, wherein the channels are located substantially uniformly within the predetermined channel periods along the first optical fiber, and wherein the width of each channel is approximately equal to one half of the predetermined channel period.

20. A system for demultiplexing a first optical signal, with a first predetermined frequency, from a multiplexed optical signal including the first optical signal and a second optical signal, with a second predetermined frequency, comprising:
 a first single-mode optical fiber with a first refractive index profile and a first propagation constant that is a function of frequency, the first optical fiber having a core and cladding, the cladding having a substantially planar surface;
 a second single-mode optical fiber with a second refractive index profile and a second propagation constant that is a function of frequency, the second optical fiber having a core and cladding, the cladding having a substantially planar surface;
 means for introducing the multiplexed optical signal into one of the first and second optical fibers;
 wherein the first refractive index profile is different than the second refractive index profile;
 wherein a plurality of channels is formed in the planar surface of the first optical fiber, the channels being spaced with a predetermined channel period, the channel period being substantially inversely proportional to the difference between the first propagation constant and the second propagation constant at the first predetermined frequency; and
 wherein the first optical fiber and the second optical fiber are joined at the planar surfaces.

21. A feedback reflector for an optical source, the optical source emitting optical signals at a design frequency, comprising:
 a first single-mode optical fiber segment with a first refractive index profile and a first propagation constant that is a function of frequency, the first optical fiber segment having a core and cladding and having first and second ends, the cladding having a substantially planar surface;
 a second single-mode optical fiber segment with a second refractive index profile and a second propagation constant that is a function of frequency, the second optical fiber segment having a core and cladding and having first and second ends, the cladding having a substantially planar surface;
 wherein a plurality of channels is formed in one of the planar surfaces, the channels being spaced with a predetermined channel period, the channel period being substantially inversely proportional to the difference between the first propagation constant and the second propagation constant at the design frequency;
 wherein the first refractive index profile is different than the second refractive index profile;
 wherein the first optical fiber segment and the second optical fiber segment are joined at the planar surfaces with the first end of the first optical fiber segment being proximate the first end of the second optical fiber segment and with the second end of the first optical fiber segment being proximate the second end of the second optical fiber segment;
 wherein the first end of the first optical fiber segment is positioned adjacent to an output port of the optical source;
 wherein the first end of the first optical fiber segment is terminated with means for reducing reflections; and wherein the second end of the second optical fiber segment is terminated with means for enhancing reflections.

22. A method of making an optical filter-coupler for coupling optical signals at a design frequency from a first single-mode optical fiber with a first refractive index profile and with a first propagation constant that is a function of frequency, the first optical fiber having a core and cladding, and from a second single-mode optical fiber with a second refractive index profile and with a second propagation constant that is a function of frequency, the second optical fiber having a core and cladding, the first refractive index profile being different than the second refractive index profile, comprising the steps of:

removing a portion of the cladding of the first optical fiber to form a first planar surface;

removing a portion of the cladding of the second optical fiber to form a second planar surface;

producing a plurality of channels in one of the first and second planar surfaces, the channels being spaced with a predetermined channel period, the channel period being substantially inversely proportional to the difference between the first propagation constant and the second propagation constant at the design frequency; and joining the first and second optical fibers at the first and second planar surfaces.

23. A method as recited in claim 22, wherein each removing step includes chemically removing the portion of the cladding.

24. A method as recited in claim 22, wherein each removing step includes mechanically removing the portion of the cladding.

25. A method as recited in claim 22, wherein each removing step further includes introducing visible optical energy into the optical fiber and removing the cladding until the optical energy is detected at the planar surface.

26. A method as recited in claim 22, wherein the producing step includes producing the plurality of channels by photolithography.

27. A method as recited in claim 22, further comprising the step of tuning the filter-coupler.

28. A method as recited in claim 27, wherein the tuning step includes moving one of the optical fibers laterally with respect to the other of the optical fibers.

29. A method as recited in claim 27, wherein the tuning step includes moving one of the optical fibers longitudinally with respect to the other of the optical fibers.

30. A method as recited in claim 27, wherein the tuning step includes moving one of the optical fibers angularly with respect to the other of the optical fibers.

31. A method as recited in claim 22, further comprising the step of producing a plurality of channels in the other of the first and second planar surfaces, the channels being spaced with the predetermined channel period.

32. A method as recited in claim 22, wherein the producing step includes locating the channels nonuniformly within the predetermined channel periods along the associated optical fiber to shape the response of the filter-coupler.

33. A method as recited in claim 22, wherein the producing step includes varying the width of the channels along the associated optical fiber to shape the response of the filter-coupler.

34. A method as recited in claim 22, wherein the producing step includes varying the depth of the channels along the associated optical fiber to shape the response of the filter-coupler.

35. A method as recited in claim 22, wherein the producing step includes producing channels with substantially the same width and substantially the same depth, locating the channels substantially uniformly within the predetermined channel periods, and making the width of each channel approximately equal to one half of the predetermined channel period.

* * * * *